W. HEMME.
STOP VALVE.
APPLICATION FILED JAN. 11, 1910.

1,018,560.

Patented Feb. 27, 1912.

Witnesses

Inventor
William Hemme.
By C. A. Snow & Co.
Attorneys

UNITED STATES PATENT OFFICE.

WILLIAM HEMME, OF ALTOONA, KANSAS.

STOP-VALVE.

1,018,560.  Specification of Letters Patent.  Patented Feb. 27, 1912.

Application filed January 11, 1910. Serial No. 537,548.

*To all whom it may concern:*

Be it known that I, WILLIAM HEMME, a citizen of the United States, residing at Altoona, in the county of Wilson and State of Kansas, have invented a new and useful Stop-Valve, of which the following is a specification.

This invention relates to improvements in valves and has for its object the provision of a valve of simple construction which will be strong and durable and easily operated.

The valve is intended more particularly for use as a cut-off in oil and gas pipe lines, but it is, of course, capable of use in other connections.

The preferred embodiment of my invention is illustrated in the accompanying drawings, and the invention consists in certain novel features of the same as will be hereinafter first fully described and then particularly pointed out in the claim.

Figure 1:
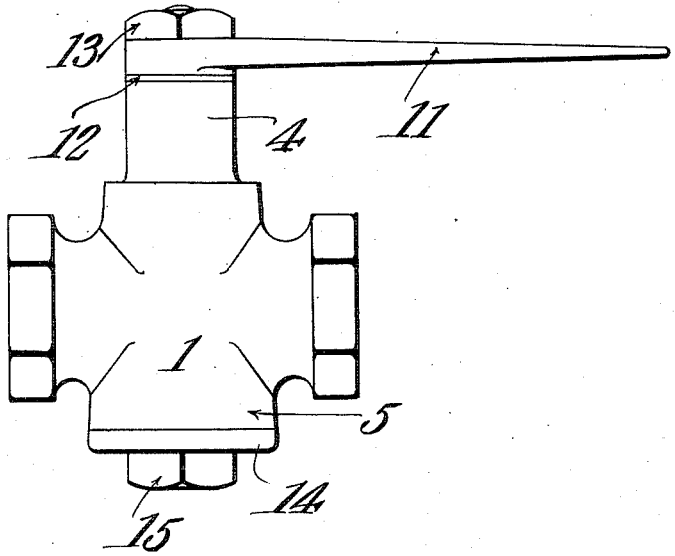
Figure 2:
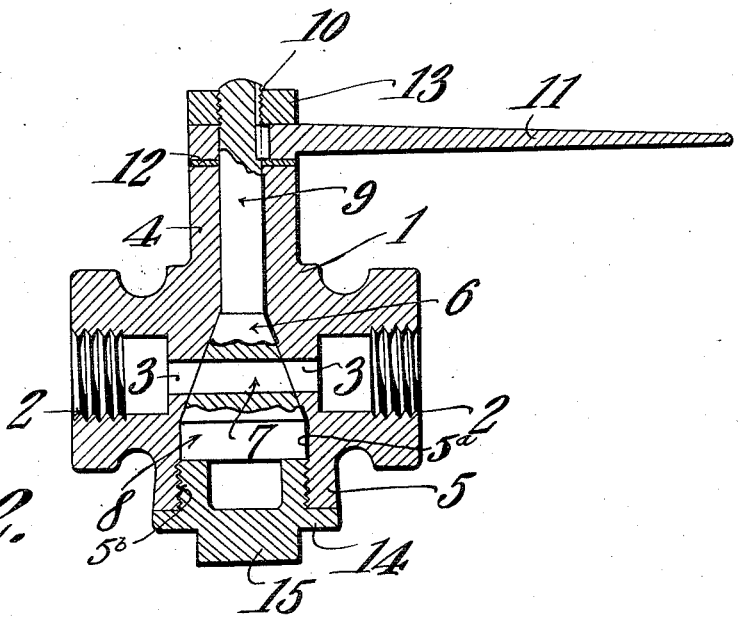

In the accompanying drawings,—Figure 1 is a side elevation of a valve constructed in accordance with my invention, and Fig. 2 is a vertical longitudinal section of the same.

In carrying out my invention I employ a valve casing 1 which is provided with suitable openings 2 for the reception of the ends of the pipes to which the valve is to be applied and communicating with the said openings 2 are ports 3 which open into a central conical chamber, as clearly shown in Fig. 2. Rising from the central body of the valve casing is a tubular stem or boss 4, while on the under side of the casing is a depending ring 5 which is smooth internally at its upper portion as at 5ª and threaded internally at its lower portion as at 5ᵇ for a purpose to be explained hereinafter, and which provides an outlet opening for the central conical chamber of the casing.

The valve proper consists of a tapered or conical plug 6 having a transverse diametrical port or passage 7 adapted to communicate with the ports 3 in the casing and form a communication between the same when the valve is in the open position illustrated in Fig. 2. The lower end or extremity of the valve body is circular and smooth, as shown at 8, and this circular portion fits in and bears against the inner face of the smooth portion 5ª of the ring 5 and thereby serves to steady the valve in its movements and prevent it wearing unevenly so that it will leak around one side. A stem 9 rises from the upper end of the conical body 6 and passes upward through the boss 4 on the casing, the upper extremity of the said stem being threaded, as indicated at 10. An operating handle 11 is keyed to the upper extremity of the stem 9, and a washer 12 is fitted around the stem between the said handle and the boss 4, as clearly shown. A nut 13 is mounted on the extreme end of the stem 9 and is adapted to be turned home against the handle, and adjustment of the nut will serve to draw the valve body upward against its conical seat so as to compensate for any wear and to hold the valve in proper working relation to the casing. Within the ring 5 I secure a cap nut 15 which is in threaded engagement with the threaded portion 5ᵇ thereof and is provided with an annular flange 14 adapted to close against the lower end of the casing when the inner end of the nut bears against the lower end of the plug. The outer end of this nut is made angular as shown so that it may be engaged by a wrench or other suitable tool for turning the nut home or loosening it so as to remove it from the valve casing.

In the accompanying drawings I have illustrated a valve adapted to connect two pipes arranged in longitudinal alinement, but it will be understood, of course, that no departure from the invention will be involved in multiplying the number of pipes or arranging the pipes at an angle to each other.

The valve is constructed of very few parts and may be easily operated, inasmuch as the taper of the conical body and the central chamber of the casing is from 55 to 60 degrees from the perpendicular so that the parts will exert the least possible friction upon each other, and the destructive effect of freezing of the valve will be avoided. Any sand or other foreign matter which may pass into the valve casing will be caused to work to the lower end of the central chamber of the casing and will there be held by the plug or cap 14 without being compacted within a small space so that if the said plug or cap be removed the valve may be freed of any accumulation of dirt. The conical shape of the valve gives more space for sand and other foreign matter to work downwardly. The conical formation of the valve shown and described with the cylindrical bearing portion at the lower end of the same will prevent the valve grinding on its seat so as to be locked thereto and consequently make the opening and closing of the valve a difficult operation.

Ordinarily, the plug 14 may be left off. It is intended principally for very high pressure, in which case the valve may be also provided with a suitable stuffing box and a packing.

Having thus described my invention, what I claim is:

A valve including a casing having a passage therein, a conical chamber intersecting the passage, there being a cylindrical chamber opening into, and of the same diameter as the base of the conical chamber, the wall of the cylindrical chamber being screw threaded, a screw plug adjustably mounted within the cylindrical chamber and having a recess for receiving gas leaking past the valve, a conical plug mounted for rotation within the conical chamber and having an opening therein adapted to move into and out of register with the passage in the casing, said plug having a cylindrical extension fitting snugly within the cylindrical chamber and bearing upon and supported by the screw plug, and a stem extending from the apex of the valve and beyond the casing.

In testimony that I claim the foregoing as my own, I have hereto affixed my signature in the presence of two witnesses.

WILLIAM HEMME.

Witnesses:
J. F. GUNBY,
W. F. LAY.

---

Copies of this patent may be obtained for five cents each, by addressing the "Commissioner of Patents, Washington, D. C."